(12) United States Patent
Thomas

(10) Patent No.: US 8,918,853 B2
(45) Date of Patent: Dec. 23, 2014

(54) METHOD AND SYSTEM FOR AUTOMATIC RECOVERY FROM LOST SECURITY TOKEN ON EMBEDDED DEVICE

(75) Inventor: Renjit Tom Thomas, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 193 days.

(21) Appl. No.: 13/135,227

(22) Filed: Jun. 29, 2011

(65) Prior Publication Data

US 2013/0007869 A1    Jan. 3, 2013

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/41 | (2013.01) |
| G06F 21/33 | (2013.01) |

(52) U.S. Cl.
CPC ............. *G06F 21/335* (2013.01); *H04L 63/168* (2013.01); *H04L 63/083* (2013.01); *G06F 21/41* (2013.01); *H04L 63/06* (2013.01)
USPC .......................................................... 726/9

(58) Field of Classification Search
USPC .......................................................... 726/9
See application file for complete search history.

(56) References Cited

U.S. PATENT DOCUMENTS

| | | | | |
|---|---|---|---|---|
| 5,621,795 | A * | 4/1997 | Baker et al. .................. | 380/277 |
| 6,026,414 | A * | 2/2000 | Anglin ................................. | 1/1 |
| 6,349,336 | B1 * | 2/2002 | Sit et al. ........................ | 709/227 |
| 7,225,161 | B2 * | 5/2007 | Lam et al. ....................... | 705/51 |
| 7,444,506 | B1 * | 10/2008 | Datta et al. .................... | 713/153 |
| 7,610,491 | B1 * | 10/2009 | Tsao .............................. | 713/184 |
| 8,060,476 | B1 * | 11/2011 | Afonso et al. ................ | 707/649 |
| 2003/0126441 | A1 * | 7/2003 | Laux et al. .................... | 713/168 |
| 2003/0187871 | A1 | 10/2003 | Amano et al. | |

(Continued)

FOREIGN PATENT DOCUMENTS

| | | |
|---|---|---|
| JP | 2005-086428 | 3/2005 |
| JP | 2006-079598 | 3/2006 |

(Continued)

OTHER PUBLICATIONS

SearchSecurity.com, Kerberos, Jun. 4, 2007, SearchSecurity.com, All Pages.*

(Continued)

*Primary Examiner* — Glenton B Burgess
*Assistant Examiner* — Imran Moorad
(74) *Attorney, Agent, or Firm* — Scot A. Reader

(57) ABSTRACT

Automatic recovery from loss of a security token on an embedded device is achieved by having a service provider (SP) server send to a device server a backup copy of the security token in conjunction with sending to an embedded device a primary copy of the security token, and retrieving from the device server and sending to the embedded device the backup copy of the security token upon detecting that the primary copy of the security token has been lost. The method and system obviate the need for a user to have to re-input on the embedded device a credential that is represented by the security token in the event the primary copy of the security token is erased from the embedded device or otherwise becomes inaccessible to the embedded device.

15 Claims, 6 Drawing Sheets

(56) References Cited

U.S. PATENT DOCUMENTS

| | | | |
|---|---|---|---|
| 2004/0111620 A1* | 6/2004 | Saunders et al. | 713/182 |
| 2004/0219905 A1* | 11/2004 | Blumenthal et al. | 455/411 |
| 2005/0030939 A1* | 2/2005 | Roy et al. | 370/352 |
| 2005/0257072 A1* | 11/2005 | Cross et al. | 713/193 |
| 2006/0031683 A1* | 2/2006 | Marion et al. | 713/185 |
| 2006/0101510 A1* | 5/2006 | Kadyk et al. | 726/12 |
| 2006/0104441 A1 | 5/2006 | Johansson et al. | |
| 2006/0143697 A1 | 6/2006 | Badenell et al. | 726/10 |
| 2006/0161665 A1 | 7/2006 | Tsai | 709/229 |
| 2006/0230264 A1* | 10/2006 | Catherman et al. | 713/155 |
| 2007/0044146 A1 | 2/2007 | Murase et al. | |
| 2007/0277233 A1* | 11/2007 | Bodin et al. | 726/9 |
| 2008/0313707 A1* | 12/2008 | Jain et al. | 726/2 |
| 2009/0106266 A1* | 4/2009 | Donatelli et al. | 707/10 |
| 2010/0030901 A1 | 2/2010 | Hallberg et al. | 709/228 |
| 2010/0202617 A1* | 8/2010 | Balakrishnan et al. | 380/277 |
| 2010/0281530 A1* | 11/2010 | Tarkoma | 726/9 |
| 2011/0026064 A1 | 2/2011 | Kato et al. | |
| 2011/0314290 A1* | 12/2011 | Fort et al. | 713/176 |
| 2012/0144050 A1* | 6/2012 | Shah | 709/229 |
| 2013/0212151 A1* | 8/2013 | Herbach et al. | 709/203 |

FOREIGN PATENT DOCUMENTS

| | | | |
|---|---|---|---|
| JP | 2008-250604 | 10/2008 | |
| JP | 2009-032017 | 2/2009 | |
| JP | 2011-034290 | 2/2011 | |
| KR | 20060103597 | 4/2008 | G06F 15/00 |

OTHER PUBLICATIONS

LastPass, Common Questions, Dec. 7, 2009, LastPass.com, All Pages.*

* cited by examiner

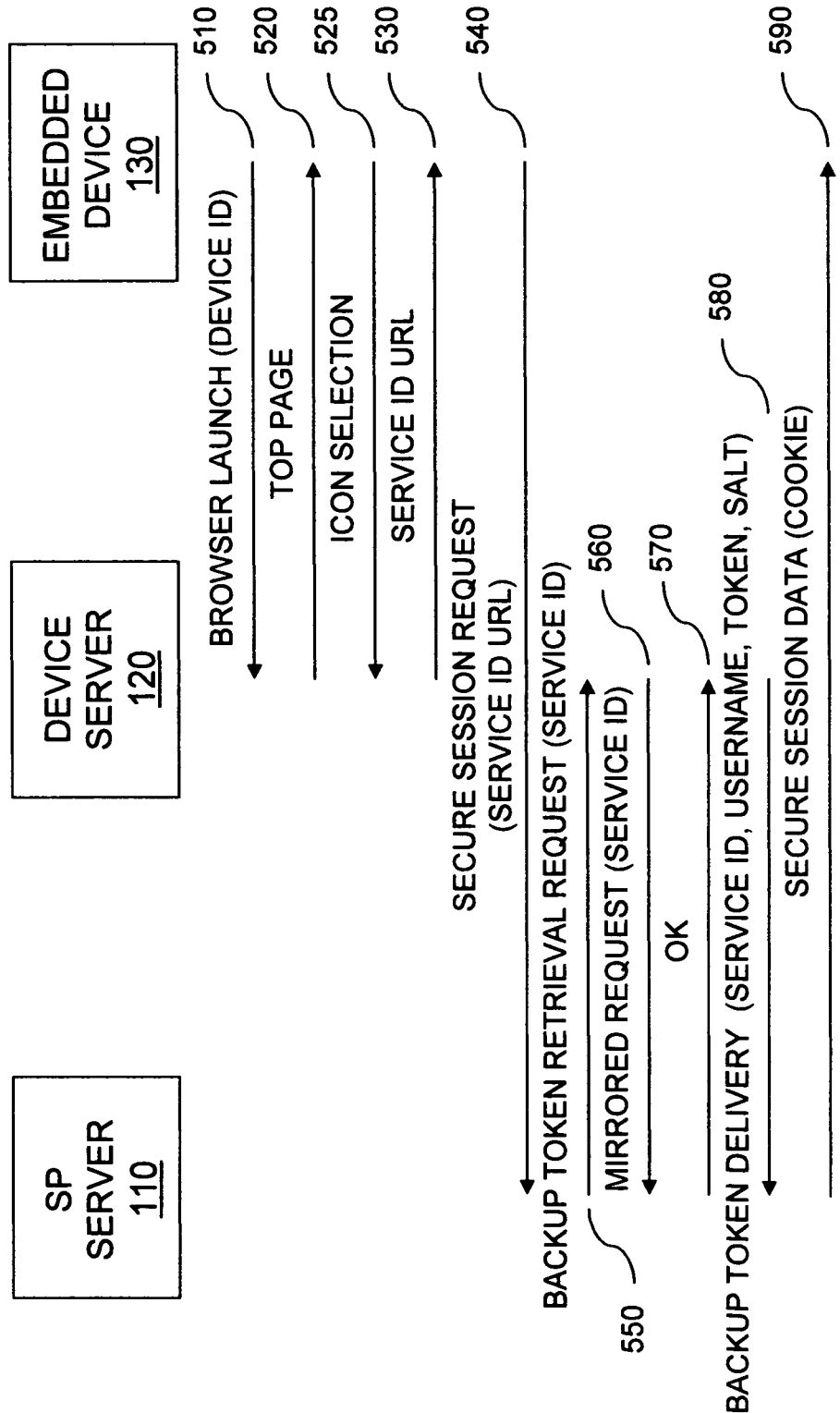

METHOD AND SYSTEM FOR AUTOMATIC RECOVERY FROM LOST SECURITY TOKEN ON EMBEDDED DEVICE

BACKGROUND OF THE INVENTION

The present invention relates to secure web content services and, more particularly, to providing secure web content services to embedded devices.

Secure web content services require a user to authenticate to the service by presenting some form of access credential before granting access to the user. To obviate the need for a user to input a credential every time the user wishes to access the service, a security token representing the credential is often created and cached. For example, the first time a user accesses a service, the user may input a credential (e.g., username and password) by hand on a user interface of a web client device. The credential is sent to the service provider (SP) server that offers the service. The SP server generates a security token representing the credential (often in compacted form), puts the security token in a cookie and sends the cookie to the web client device. The web client device caches the cookie. The next time the user accesses the service, the web client device retrieves the cookie from the cache and sends the cookie to the SP server, relieving the user of the burden to input the credential by hand a second time.

Sometimes security tokens are erased from memory on a web client device. For example, on a personal computer, resetting the web browser or erasing the web browser history can cause a security token to be erased. On an embedded device, a software update can cause a security token to be erased. Moreover, due to severe memory constraints, many embedded devices have a limit on the number of cookies that can be simultaneously stored. If this limit is exceeded, the older cookies are discarded to make space for newer cookies, which can cause a security token to be erased.

The loss of a security token can be fairly easy to recover from when the web client device is a personal computer. The user can often simply re-input the credential on the web client device's qwerty keyboard and a new security token can be generated from the credential.

However, the loss of a security token can be much more difficult to recover from when the web client device is an embedded device. Many embedded devices receive user input on a keypad or an attached television. Thus, the user may have to make a multi-tap input on a keypad or navigate across a virtual on-screen keyboard using directional arrows to re-input each character of the credential. This consumes the user's valuable time and can be stressful as the user has to not only remember the credential but input it via a suboptimal interface.

SUMMARY OF THE INVENTION

The present invention provides a method and system for automatic recovery from loss of a security token on an embedded device. Automatic recovery is achieved by having a SP server send to a device server a backup copy of the security token in conjunction with sending to an embedded device a primary copy of the security token, and retrieving from the device server and sending to the embedded device the backup copy of the security token upon detecting that the primary copy of the security token has been lost. The recovery mechanism preferably adheres to standard and secure protocols. The method and system obviate the need for a user to have to re-input on the embedded device a credential that is represented by the security token in the event the primary copy of the security token is erased from the embedded device or otherwise becomes inaccessible to the embedded device.

In one aspect of the invention, a method for automatic recovery from a lost security token on an embedded device comprises the steps of receiving, by a SP server, from an embedded device, a credential for accessing a secure web content service offered by the SP server; generating, by the SP server, a security token representing the credential; sending, by the SP server, to the embedded device and a device server, the security token; receiving, by the SP server, from the embedded device, a request to access the service; detecting, by the SP server, that the request does not include the security token; retrieving, by the SP server, from the device server, the security token; and resending, by the SP server, to the embedded device, the security token.

In some embodiments, the SP server, the device server and the embedded device communicate using standard and secure protocol messages.

In some embodiments, the standard and secure protocol messages comprise Hypertext Transfer Protocol Secure (HTTPS) messages.

In some embodiments, the step of sending the security token to the embedded device and the device server comprises the substeps of sending, by the SP server, to the embedded device, a login acceptance message having a cookie including the security token; and sending, by the SP server, to the device server, a backup token storage request including the security token.

In some embodiments, the step of sending the security token to the embedded device and the device server further comprises the substeps of receiving, by the SP server, from the device server, a mirrored request mirroring the backup token storage request; and sending, by the SP server, to the device server, a verification message responsive to the mirrored request.

In some embodiments, the step of sending the security token to the embedded device and the device server comprises sending, by the SP server, to the embedded device, a secure session response including the security token and Javascript causing the embedded device to redirect a secure session to a Uniform Resource Locator (URL) of the device server.

In some embodiments, the security token comprises the credential.

In some embodiments, the security token comprises a hash of the credential.

In some embodiments, the security token comprises a hash of the credential and random salt.

In some embodiments, the credential comprises a username and password.

In some embodiments, the credential comprises a password.

In some embodiments, the credential comprises a personal identification number (PIN).

In some embodiments, the method further comprises the step of authenticating, by the SP server, a user of the embedded device using the security token retrieved from the device server.

In another aspect of the invention, a SP server comprises at least one network interface; and at least one processor communicatively coupled with the network interface, wherein the SP server receives from an embedded device via the network interface a credential for accessing a secure web content service offered by the SP server, generates under control of the processor a security token representing the credential, sends to the embedded device and a device server via the network interface the security token, receives from the embedded device via the network interface a request for accessing the service, detects under control of the processor that the request does not include the security token, retrieves from the device server via the network interface the security token, and resends to the embedded device via the network interface the security token.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 5 shows a message flow for accessing a secure web content service using a backup copy of a security token in some embodiments of the invention, in the event the primary copy of the token is lost.

DETAILED DESCRIPTION OF A PREFERRED EMBODIMENT

Figure 1:
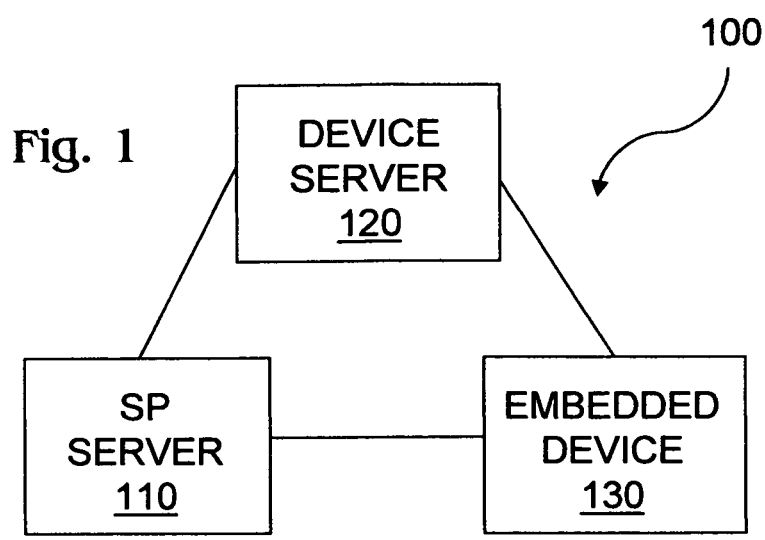
FIG. 1 shows a secure content delivery system in some embodiments of the invention.

FIG. 1 shows a secure content delivery system 100 in some embodiments of the invention. Delivery system 100 includes a SP server 110, an embedded device 130 and a device server 120. SP server 110, device server 120 and embedded device 130 are communicatively coupled over wired and/or wireless connections using a well-known networking protocol, such as TCP/IP.

SP server 110 is a web server that offers one or more secure web content services to web client devices in accordance with SP display guidelines. In some embodiments, secure web content services include Really Simple Syndication (RSS) web feeds.

Embedded device 130 has a limited user input interface. In some embodiments, embedded device 130 receives user input solely on a keypad using a multi-tap input mode to select characters. In other embodiments, embedded device 130 receives user input solely on a virtual on-screen keyboard using directional arrows to navigate to characters on the keyboard and a selection button to select characters.

Embedded device 130 is an embedded web client device that receives secure web content in at least one of the secure web content services offered by SP server 110, resulting in web pages being delivered from SP server 110 and displayed on embedded device 130 in accordance with SP display guidelines. Embedded device 130 has a web browser for accessing secure web content services and displaying web pages in the secure web content services.

SP server 110 requires a user of embedded device 130 to authenticate to secure web content services offered by SP server 110 by presenting an access credential before granting access to the user. A first time the user requests access to a service from embedded device 130, the user inputs on embedded device 130 by hand a credential (e.g., username and password) that is sent to SP server 110. Once the user is authenticated, SP server 110 generates a security token representing the credential, possibly in abbreviated form, places the security token a cookie, and sends the cookie to embedded device 130. Embedded device 130 stores the cookie in a cache on embedded device 130. In subsequent requests to access the service, embedded device 130 retrieves the cookie from the cache and sends the cookie to SP server 110, relieving the user of the burden to re-input the credential by hand. Moreover, in conjunction with sending the security token to embedded device 130, SP server 110 sends to device server 120 a backup copy of the security token that is stored on device server 120. Upon detecting in a subsequent access request that the security token has been lost on embedded device 130 (e.g., erased from embedded device 130 during a software update or because a limit on the number of cookies has been exceeded), SP server 110 retrieves from device server 120 the backup copy of the security token, places the security token in a cookie, and sends the cookie 130 to embedded device 130, achieving automatic recovery from the lost security token. Where the credential is a username and password, the security token may consist of, by way of example, the password, a concatenation of the username and password, a hash of the password, a hash of the concatenated username and password, a hash of the password with random salts, or a hash of the concatenated username and password with random salts.

Figure 2:
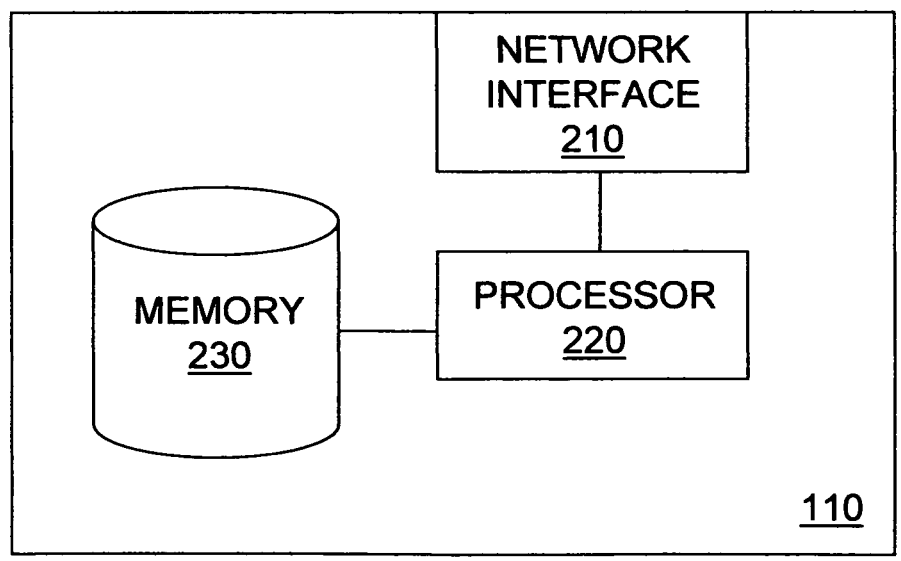
FIG. 2 shows a SP server in some embodiments of the invention.

Turning now to FIG. 2, SP server 110 is shown in some embodiments of the invention to include a processor 220 communicatively coupled between a network interface 210 and a memory 230. In some embodiments, processor 210 performs the functions attributed herein by executing software stored in memory 230, although in other embodiments a processor may perform such functions in a combination of software and custom logic. Moreover, while SP server 110 is shown as a single server, in some embodiments the elements and functions shown and described herein as being associated with SP server 110 may be distributed across multiple servers each having at least one network interface, at least one processor and at least one memory. Moreover, in some embodiments, one or more of the elements and functions shown and described herein as being associated with SP server 110 may be implemented on device server 120 or embedded device 130.

Figure 3:
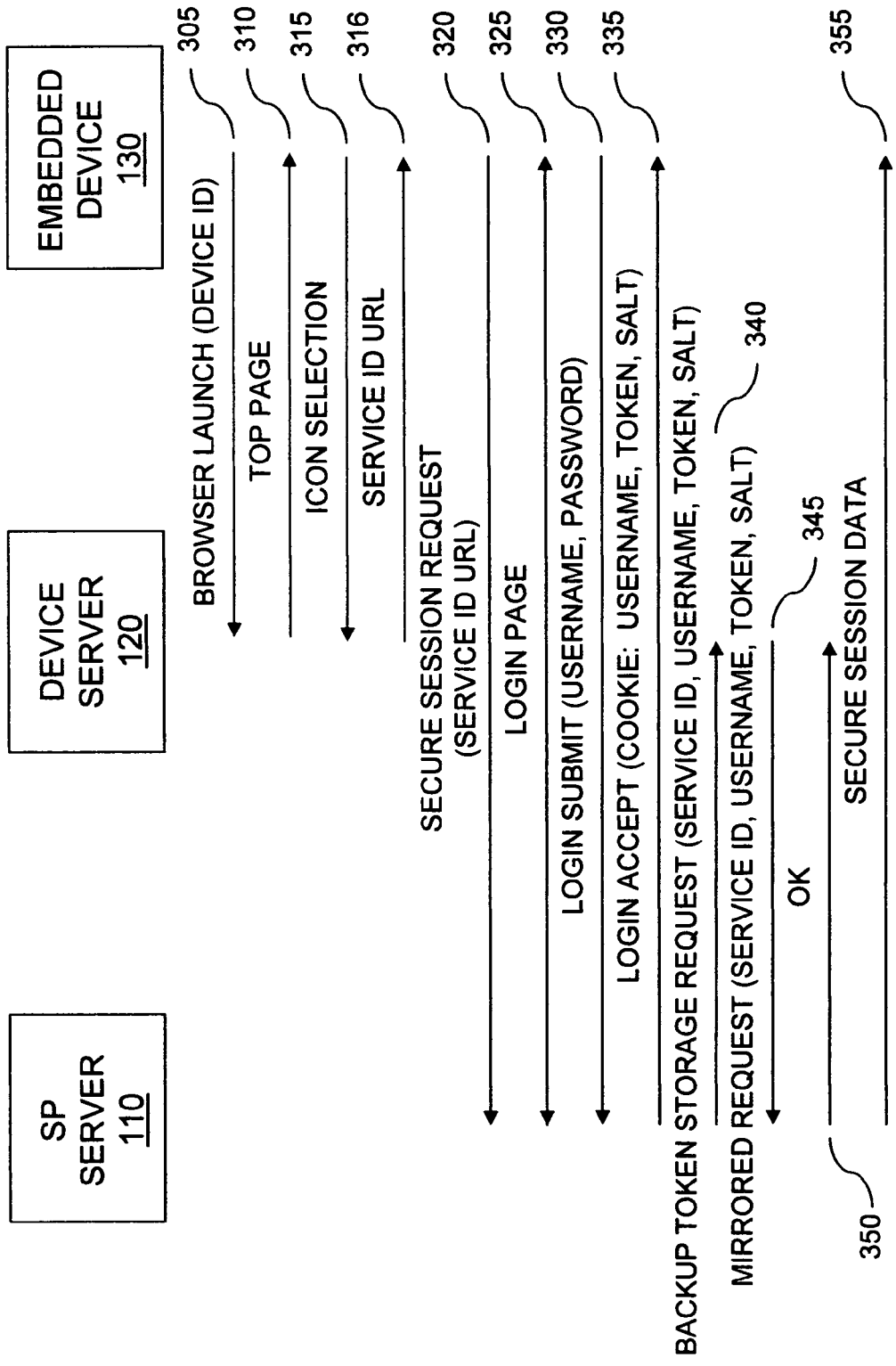
FIG. 3 shows a one-time message flow for storing a primary and backup copy of a security token in some embodiments of the invention.

Referring to FIG. 3, a one-time message flow for storing a primary and backup copy of a security token is shown in some embodiments of the invention. In these embodiments, the messages in the flow are HTTPS messages and may include Extensible Markup Language (XML) data, except as otherwise noted.

The message flow of FIG. 3 begins when a user launches a web browser on embedded device 130 (305). In conjunction with launching the web browser, a unique device identifier (DEVICE ID) of embedded device 130 is sent to device server 120. The DEVICE ID may be a media access control (MAC) address or a serial number of embedded device 130, by way of example. In response to launch of the web browser, device server 120 renders a top page on the web browser of embedded device 130 (310). The top page displays selectable icons that represent secure web content services offered by SP server 110. When one of the selectable icons is selected by the user of embedded device 130 (315), a service URL (SERVICE ID URL) of the service represented by the selected icon is returned to embedded device 130 (316).

The DEVICE ID may be acquired by device server 120 from embedded device 130 in various ways. In some embodiments, device server 120 sends to embedded device 130 a web page including a custom embedded object. When the web browser on embedded device 130 detects the object and verifies that the web page came from the server domain of device server 120, the web browser executes a client side script to retrieve the DEVICE ID and sends the DEVICE ID to device server 120. Device server 120 may then place the DEVICE ID into a cookie and send the cookie to embedded device 130 for faster access during subsequent web browser launches. In other embodiments, device server 120 may issue a custom server header directive to the web browser on embedded device 130 and the web browser may send the DEVICE ID to device server 120 in a response header.

Each SERVICE ID URL is a concatenation of a SP identifier unique to SP server 110 and a service identifier unique to a secure web content service and device. For example, where a SP identifier is sps and a service identifier (SERVICE ID) is abc a SERVICE ID URL for the service would be https://sps/service?serviceId=abc.

SERVICE IDs of secure web content services offered by SP server 110 to embedded device 130 are associated with the DEVICE ID of embedded device 130 and stored in a database at the device server 120. When the web browser is launched on embedded device 130, device server 120 acquires the DEVICE ID from embedded device 130 and uses the DEVICE ID as a lookup key to retrieve the SERVICE ID. Device server 120 then dynamically creates the top page including the selectable icons representing services offered by SP server 110 to embedded device 130 that when selected by a user of embedded device 130 causes the SERVICE ID URL of the selected service to be returned to embedded device 130.

In response to receiving a SERVICE ID URL of a secure web content service selected by a user, embedded device 130 sends a secure session request containing the SERVICE ID URL to SP server 110 (320).

In response to receiving the secure session request containing the SERVICE ID URL via network interface 210, SP server 110 generates under the control of processor 220 and sends to embedded device 130 via network interface 210 a login page for the secure web content service at the SERVICE ID URL (325). The login page is rendered on the web browser of embedded device 130 and includes text boxes into which the user of embedded device 130 enters a username and password as well as a submit button. This login page is rendered only the very first time the SERVICE ID URL is accessed by the web browser.

When the user activates the submit button, embedded device 130 sends a login submission containing the username and password to SP server 110 via network interface 210 (330).

In response to receiving the login submission containing the username and password via network interface 210, SP server 110 under the control of processor 220 authenticates the user to the service. In some embodiments, the user is authenticated by finding a matching username and password in a user account stored in memory 230 or on an authentication server accessed by SP server 110 via network interface 210. The user account may be established in an earlier setup process wherein the user inputs the username and password and other information required by SP server 110 to subscribe to the service, such as payment information, on a personal computer.

Upon authenticating the user, SP server 110 generates a security token using the password, the username and random salt, places the security token, the username and the random salt in a cookie, generates a login acceptance containing the cookie, and sends the login acceptance to embedded device 130 (335). The login acceptance may include a "thank you" web page noting successful authentication or a secure top page of the service. In response to receiving the login acceptance, embedded device 130 caches the cookie on embedded device 130. Naturally, where random salt is not used to generate the security token it is not included in the login acceptance.

Upon authenticating the user, SP server 110 also generates a backup token storage request containing the SERVICE ID of the service, the username, the security token and the random salt and sends the backup token storage request to device server 120 (340). For example, assume that the device server 120 has an identifier ds, the service has a SERVICE ID abc, the security token is 123 and the username and random salt were not used in generating the security token. In that event, the backup token storage request may take the form https://ds/storesecure/serviceId=abc&token=123. SP server 110 also temporarily caches in memory 230 the SERVICE ID in association with the security token.

In response to the backup token storage request, device server 120 generates and sends a mirrored request to SP server 110 in an attempt to verify that the backup token storage request originated from SP server 110 (345). The mirrored request contains the SERVICE ID of the service, the username, the security token and the random salt. For example, assume that SP server 110 has an identifier sps, the service has an identifier abc, the security token is 123 and the username and random salt were not used in generating the security token. In that event, the mirrored request may take the form https://sps/verifyset?serviceId=abc&token=123.

In response to receiving the mirrored request, SP server 110 uses the SERVICE ID as a lookup key in memory 230 and verifies that the security token in the mirrored request matches the temporarily cached security token. Upon verification, SP server 110 generates and sends to device server 120 a verification message (350). The verification message may be an unsecured plaintext or XML message over HTTPS.

In response to receiving the verification message, device server 120 retrieves the DEVICE ID using the SERVICE ID as a lookup key in database of device server 120 and stores the username, security token and random salt on device server 120 in association with the DEVICE ID.

In other embodiments, the backup token storage request includes an XML signature and a certificate attached to the signature, obviating the need for the mirrored request and verification message.

It bears noting that at this point in the message flow a primary copy of the security token has been stored on embedded device 130 in the form of a cookie and that a backup copy of the security token has been stored on device server 120 in association with the DEVICE ID of embedded device 130.

A secure session in which data within the secure web content service flow from SP server 110 to embedded device 130 then proceeds to completion (355).

In other embodiments, backup token storage on device server 120 is realized without the above HTTPS calls from SP server 110 to device server 120. In these other embodiments, the login acceptance sent from SP server 110 to embedded device 130 includes Javascript in the response body causing the web browser on embedded device 130 to redirect the URL to device server 120, for example, to https://ds/storesecure/serviceId=abc&token=123. Upon receiving this redirected request, device server 120 stores the username, security token and random salt from the login acceptance in association with the DEVICE ID of embedded device 130 and generates a response with Javascript in the response body causing the web browser on embedded device 130 to redirect the URL to the top page of the service, along with the SERVICE ID, the username, the security token and random salt. Upon receiving this redirected request, SP server 110 authenticates the user to the service and sends the secure top page of the service to embedded device 130 for display by the web browser, along with a cookie containing the username, security token and random salt.

Figure 4:
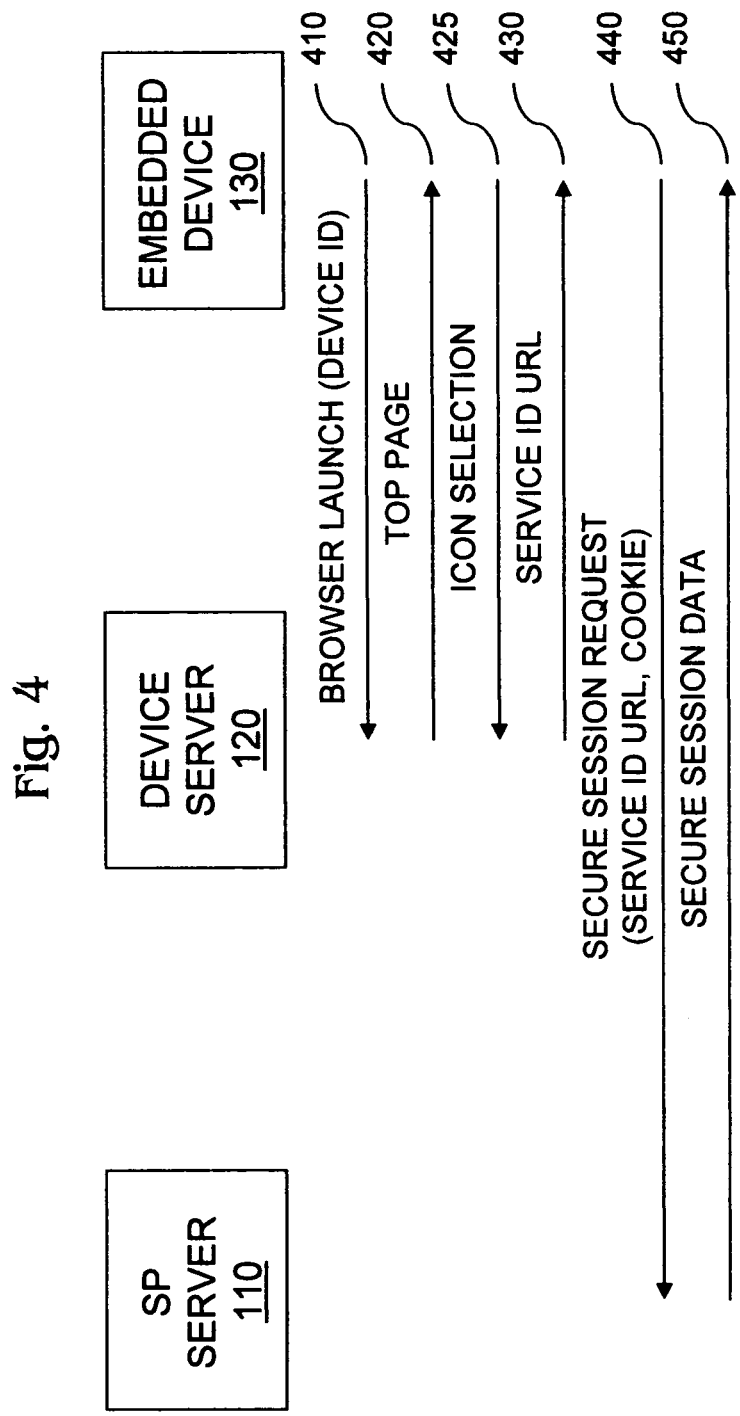
FIG. 4 shows a message flow for accessing a secure web content service using a primary copy of the security token in some embodiments of the invention.

FIG. 4 shows a message flow for accessing a secure web content service using the primary copy of the security token stored on embedded device 130 in some embodiments of the invention. In these embodiments, the messages in the flow are HTTPS messages, except as otherwise noted.

The message flow begins when a user launches the web browser on embedded device 130 (410). In conjunction with launching the web browser, the DEVICE ID of embedded device 130 is sent to device server 120. Device server 120 renders the top page on embedded device 130 (420). The top page includes selectable icons representing secure web content services offered by SP server 110. When one of the selectable icons is selected by a user of embedded device 130 (425), the SERVICE ID URL of the service represented by the selected icon is returned to embedded device 130 (430). Embedded device 130 sends a secure session request containing the SERVICE ID URL and the cookie to SP server 110 (440). SP server 110 authenticates the user using the cookie and sends the secure top page for the service to embedded device 130, whereupon a secure session in which data within the service flows from SP server 110 to embedded device 130 proceeds to completion (450).

FIG. 5 shows a message flow for accessing a secure web content service using the backup copy of a security token stored on device server 120 in some embodiments of the invention. In these embodiments, the messages in the flow are HTTPS messages which may contain XML data, except as otherwise noted. This message flow happens when the user of embedded device attempts to access the service after the cookie has been erased from embedded device 130 but before the cookie has been automatically recovered.

The message flow begins when the user launches the web browser on embedded device 130 (510). In conjunction with launching the web browser, the DEVICE ID of embedded device 130 is sent to device server 120. In response to launch of the web browser, device server 120 renders the top page on embedded device 130 (520). The top page includes selectable icons representing secure web content services offered by SP server 110. When one of the selectable icons is selected by the user (525), the SERVICE ID URL of the service represented by the selected icon is returned to embedded device 130 (530). In response to receiving the SERVICE ID, embedded device 130 sends a secure session request containing the SERVICE ID URL but without the cookie to SP server 110 (540), since the cookie has been erased from the cache on embedded device 130. Thus, in this case, the username, security token and random salt do not accompany the SERVICE ID URL.

In response to receiving the secure session request without the cookie, SP server 110 generates a backup token retrieval request containing the SERVICE ID and sends the backup token retrieval request to device server 120 (550). For example, assume that the device server 120 has the identifier ds and the service has the identifier abc. In that event, the backup token retrieval request may take the form https://ds/getsecure/serviceId=abc.

In response to the backup token retrieval request, device server 120 generates and sends a mirrored request to SP server 110 to verify that the backup token storage request was sourced by SP server 110 (560). The mirrored request contains the SERVICE ID. For example, assume that SP server 110 has the identifier sps and the service has the identifier abc. In that event, the mirrored request may take the form https://sps/verifyget?serviceId=abc.

In response to receiving the mirrored request, SP server 110 verifies that SP server 110 issued the backup token retrieval request for the SERVICE ID contained in the mirrored request. Upon verification, SP server 110 generates and sends to device server 120 a verification message (570). The verification message may be an unsecured plaintext or XML message on HTTPS.

In response to receiving the verification message, device server 120 retrieves the DEVICE ID from memory on device server 120 using the SERVICE ID as a lookup key and retrieves the username, security token and random salt on device server 120 using the DEVICE ID as a lookup key. Device server 120 generates and sends to SP server 110 a backup token delivery message including the SERVICE ID, username, security token and random salt (580). In some embodiments, username and salt may be nonexistent.

In response to the backup token delivery message, SP server 110 places the username, the security token and the random salt in a cookie and sends the secure top page for the service, accompanied by the cookie, to embedded device 130, whereupon a secure session in which data within the secure web content service flows from SP server 110 to embedded device 130 proceeds to completion (590). Embedded device 130 caches the cookie on embedded device 130, completing automatic recovery from the lost cookie.

In some embodiments, the backup token retrieval request includes an XML signature and a certificate attached to the signature, obviating the need for the mirrored request and verification message.

In other embodiments, backup token retrieval from device server 120 is realized without the above HTTPS calls from SP server 110 to device server 120. In these other embodiments, a secure session response sent from SP server 110 to embedded device 130 includes Javascript in the response body causing the web browser on embedded device 130 to redirect the URL to device server 120, for example, to https://ds/getsecure/serviceId=abc. Upon receiving this redirected request, device server 120 retrieves the username, security token and random salt using the DEVICE ID of embedded device 130 and generates a response including Javascript in the response body causing the web browser on embedded device 130 to redirect the URL to the top page of the service, along with the SERVICE ID, the username, the security token and random salt. Upon receiving this redirected request, SP server 110 authenticates the user to the service and sends the secure top page of the service to embedded device 130 for display by the web browser, along with a cookie containing the username, security token and random salt for caching on embedded device 130.

In other embodiments, the need to input a credential on embedded device 130 may be minimized even further by invoking a personal computer that links a username and password to embedded device 130. In these other embodiments, the user inputs a username and password on a personal computer, which sends the username and password to SP server 110. SP server 110 generates a short PIN and caches the PIN on SP server 110 for a short period. The user inputs the PIN on embedded device 130 and the PIN is sent to SP server 110 whereupon SP server 110 verifies the PIN within the short period. SP server 110 proceeds to generate a security token using the password and optionally the username and random salt as described in earlier embodiments.

Figure 6A:
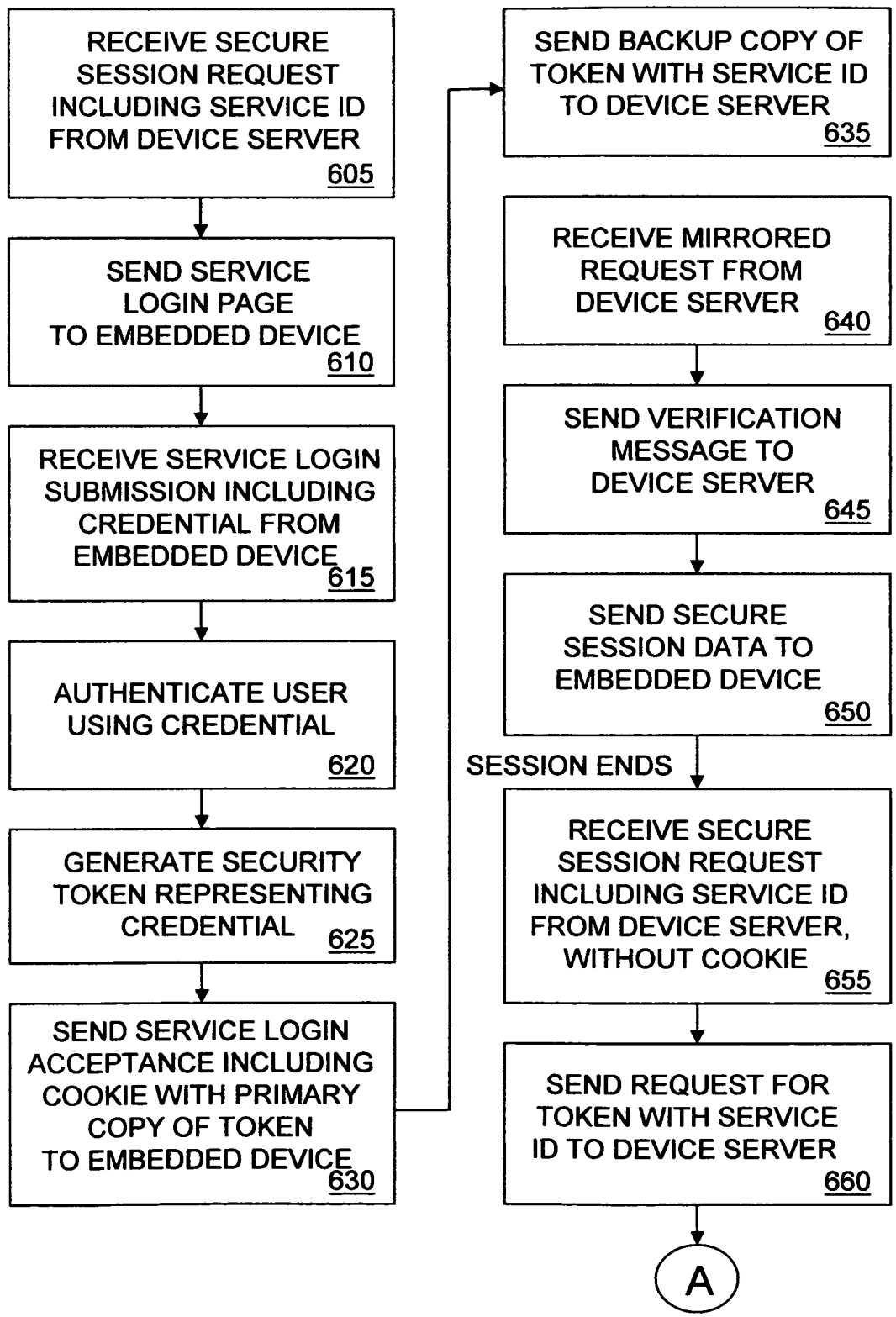
FIGS. 6A and 6B show a method for automatic recovery from a lost security token in some embodiments of the invention.
Figure 6B:
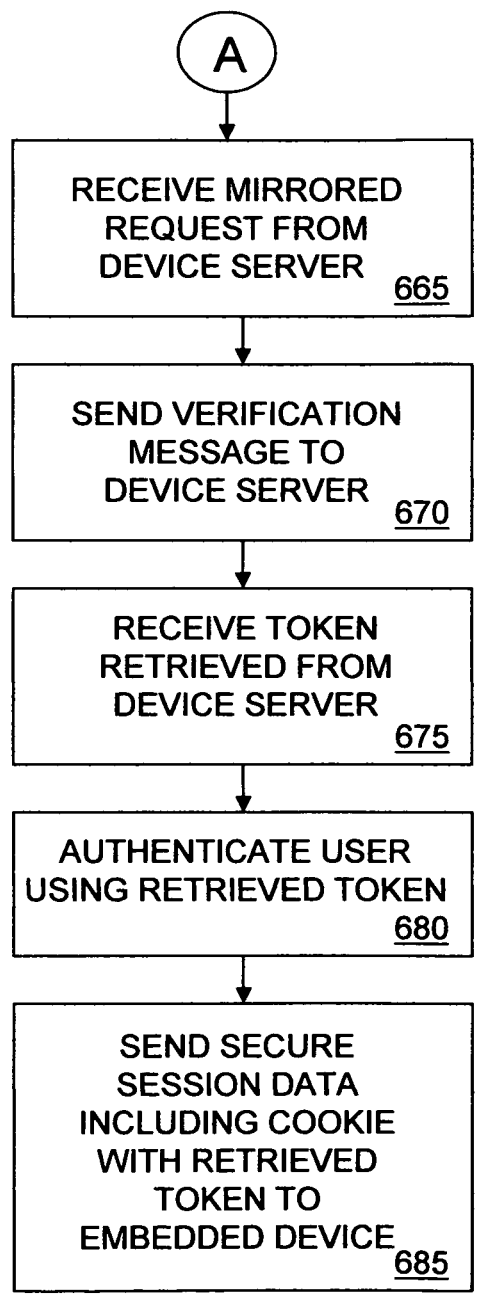

Turning finally to FIGS. 6A and 6B, a method for automatic recovery from a lost security token on embedded device 130 is shown in some embodiments of the invention. The method is performed by SP server 110. Information sent by SP server 110 to device server 120 or embedded device 130 or received by SP server 110 from device server 120 or embedded device 130 in the method is sent or received via network interface 210, and processing functions are performed in the method under the control of processor 220.

At the outset, SP server 110 receives a secure session request including a SERVICE ID from the browser on embedded device 130 via device server 120 (605). In response, SP server 110 generates and sends a login page for the service at the SERVICE ID URL to embedded device 130 (610). SP server 110 next receives a login submission including a credential (e.g., username and password) from embedded device 130 (615). SP server 110 next authenticates the user using the credential (620) and generates a security token representing the credential (625). SP server 110 next places a copy of the security token in a cookie, generates a login acceptance including the cookie and sends the login acceptance to embedded device 130 (630). This copy of the security token is considered the primary copy as it will be used to authenticate the user of embedded device 130 unless and until the cookie is erased from embedded device 130. SP server 110 also generates and sends a backup token storage request including a copy of the security token and the SERVICE ID to device server 120 (635). This copy of the security token is considered the backup copy as it will be used to authenticate the user of embedded device 130 only after the cookie is erased from embedded device 130. SP server 110 next receives a request that mirrors the backup token storage request from device server 120 (640), verifies the security token in the mirrored request, and returns a verification message to device server 120 (645), whereupon the backup copy of the security token become stored on device server 120. SP server 110 then conducts a secure session with embedded device 130 in which data within the secure web content service flows from SP server 110 to embedded device 130 (650). That secure session proceeds to completion.

Eventually, the user of embedded device 130 attempts to establish a new session with the secure web content service after the cookie has been erased from embedded device 130. At that point, SP server 110 receives a secure session request including the SERVICE ID URL of the service, but missing the cookie, from device server 120 (655). In response, SP server 110 generates and sends a backup token retrieval request including the SERVICE ID to device server 120 (660). SP server 110 receives a request that mirrors the backup token retrieval request from device server 120 (665), verifies that SP server 110 has issued a backup token retrieval request for the SERVICE ID in the mirrored request, and returns a verification message to device server 120 (670), whereupon the backup copy of the security token is retrieved on device server 120. SP server 110 receives a backup token delivery message from device server 120 including the retrieved token (675) and SP server 110 authenticates the user of embedded device 130 using the retrieved security token (680). SP server 110 then places the security token into a cookie and conducts a secure session with embedded device 130 in which data within the secure web content service including the cookie flows from SP server 110 to embedded device 130 (685), achieving automatic recovery from the lost cookie.

In some embodiments the security token is generated using the username and/or random salt, and in these embodiments the username and random salt are sent between SP server 110, device server 120 and embedded device 130 along with the security token.

It will be appreciated by those of ordinary skill in the art that the invention can be embodied in other specific forms without departing from the spirit or essential character hereof. The present description is thus considered in all respects to be illustrative and not restrictive. The scope of the invention is indicated by the appended claims, and all changes that come with in the meaning and range of equivalents thereof are intended to be embraced therein.

What is claimed is:

1. A method for automatic recovery from a lost security token on an embedded device, comprising the steps of:
    receiving, by a service provider server, from an embedded device, a first request to conduct a first session with a secure web content service offered by the service provider server;
    receiving, by the service provider server, from the embedded device, a credential for authenticating to the service;
    generating, by the service provider server, a security token representing the credential;
    sending, by the service provider server, to the embedded device and a device server, the security token, wherein the service provider server and the device server are distinct structural elements;
    receiving, by the service provider server, from the embedded device, a second request to conduct a second session with the service;
    detecting, by the service provider server, that the second request does not include the security token;
    retrieving, by the service provider server, from the device server, the security token; and
    resending, by the service provider server, to the embedded device, the security token, wherein the first request and the second request are each preceded by:
    sending, from the embedded device, to the device server, a device identifier of the embedded device;
    dynamically creating, by the device server based on the device identifier, a menu identifying one or more secure web content services offered to the embedded device by one or more service provider servers:
    sending, from the device server, to the embedded device, the menu;
    sending, from the embedded device, to the device server, a selection of the service from the menu; and
    sending, from the device server, to the embedded device, a service identifier of the service.

2. The method of claim 1, wherein the service provider server, the device server and the embedded device communicate using standard and secure protocol messages.

3. The method of claim 2, wherein the standard and secure protocol messages comprise Hypertext Transfer Protocol Secure (HTTPS) messages.

4. The method of claim 1, wherein the step of sending the security token to the embedded device and the device server comprises the substeps of:
    sending, by the service provider server, to the embedded device, a login acceptance message having a cookie including the security token; and
    sending, by the service provider server, to the device server, a backup token storage request including the security token.

5. The method of claim 4, wherein the step of sending the security token to the embedded device and the device server further comprises the substeps of:
    receiving, by the service provider server, from the device server, a mirrored request mirroring the backup token storage request; and sending, by the service provider server, to the device server, a verification message responsive to the mirrored request.

6. The method of claim 1, wherein the step of sending the security token to the embedded device and the device server comprises sending, by the service provider server, to the embedded device, a secure session response including the security token and Javascript causing the embedded device to redirect a secure session to a Uniform Resource Locator (URL) of the device server.

7. The method of claim 1, wherein the security token comprises the credential.

8. The method of claim 1, wherein the security token comprises a hash of the credential.

9. The method of claim 1, wherein the security token comprises a hash of the credential and random salt.

10. The method of claim 1, wherein the credential comprises a username and password.

11. The method of claim 1, wherein the credential comprises a password.

12. The method of claim 1, wherein the credential comprises a personal identification number (PIN).

13. The method of claim 1, further comprising the step of authenticating, by the service provider server, a user of the embedded device using the security token retrieved from the device server.

14. The method of claim 1, further comprising the step of receiving, by the service provider server, from the device server, e the service identifier, wherein the step of sending the security token comprises sending the service identifier to the device server in conjunction with the security token.

15. A secure content delivery system, comprising:

an embedded device configured to send to a service provider server a first request to conduct a first session with a secure web content service offered by the service provider server and a credential for authenticating to the service, receive from the service provider server a security token representing the credential in response to the first request, send to the service provider server a second request to conduct a second session with the service that does not include the security token and receive from the service provider server the security token in response to the second request; and a device server communicatively coupled with the embedded device configured to receive from the service provider server the security token in response to the first request and send the security token to the service provider server in response to the second request, further configured before each of the first and second request to receive from the embedded device a device identifier of the embedded device, dynamically create based on the device identifier and send to the embedded device a menu identifying one or more secure web content services offered to the embedded device by one or more service provider servers, receive from the embedded device a selection of the service from the menu and send to the embedded device a service identifier of the service, wherein the service provider server and the device server are distinct structural elements.

\* \* \* \* \*